May 21, 1929.  W. N. LURCOTT  1,713,973
RECEPTACLE WASHING MACHINE
Filed July 19, 1926   14 Sheets-Sheet 8
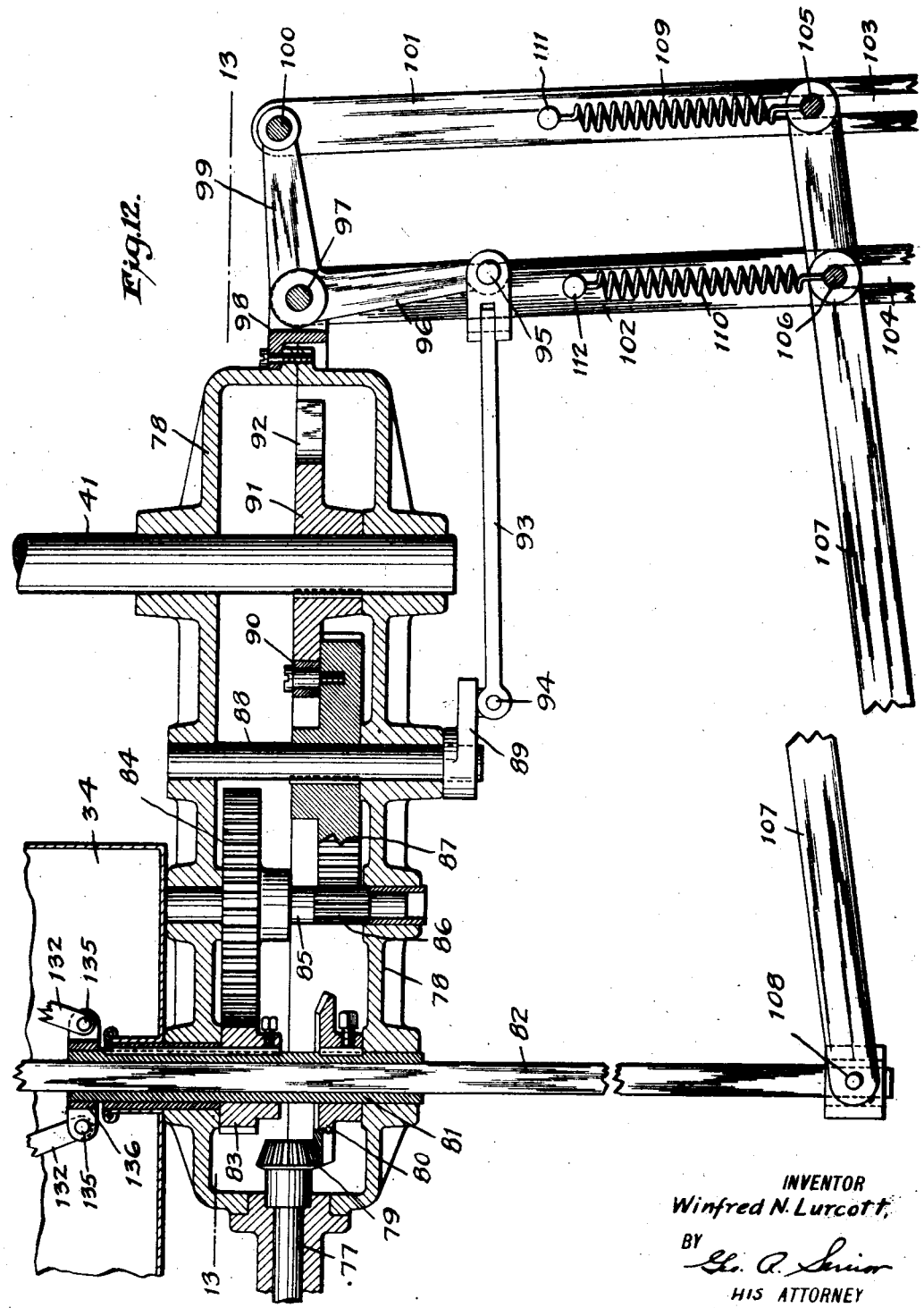
INVENTOR
Winfred N. Lurcott,
BY
HIS ATTORNEY

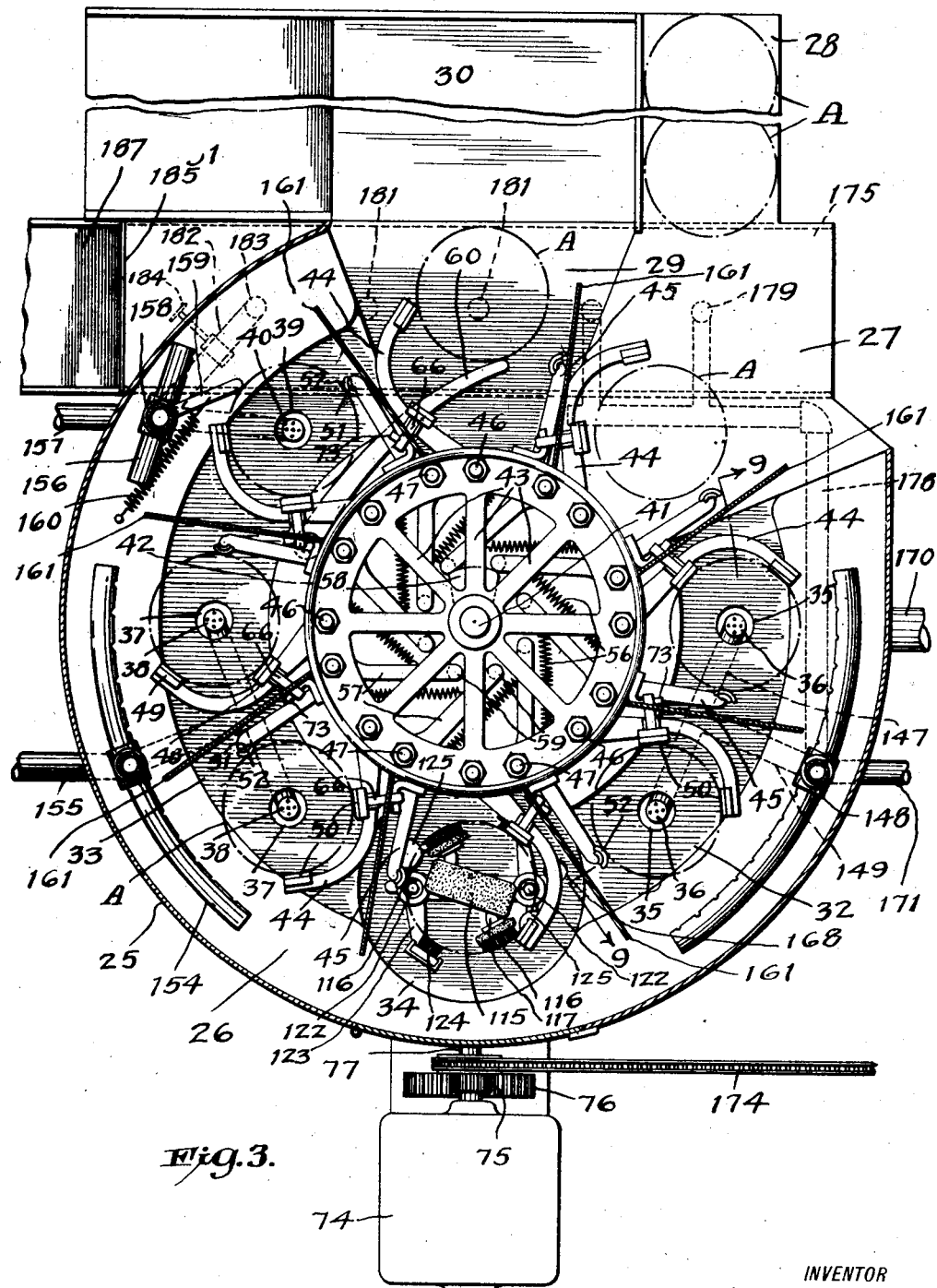

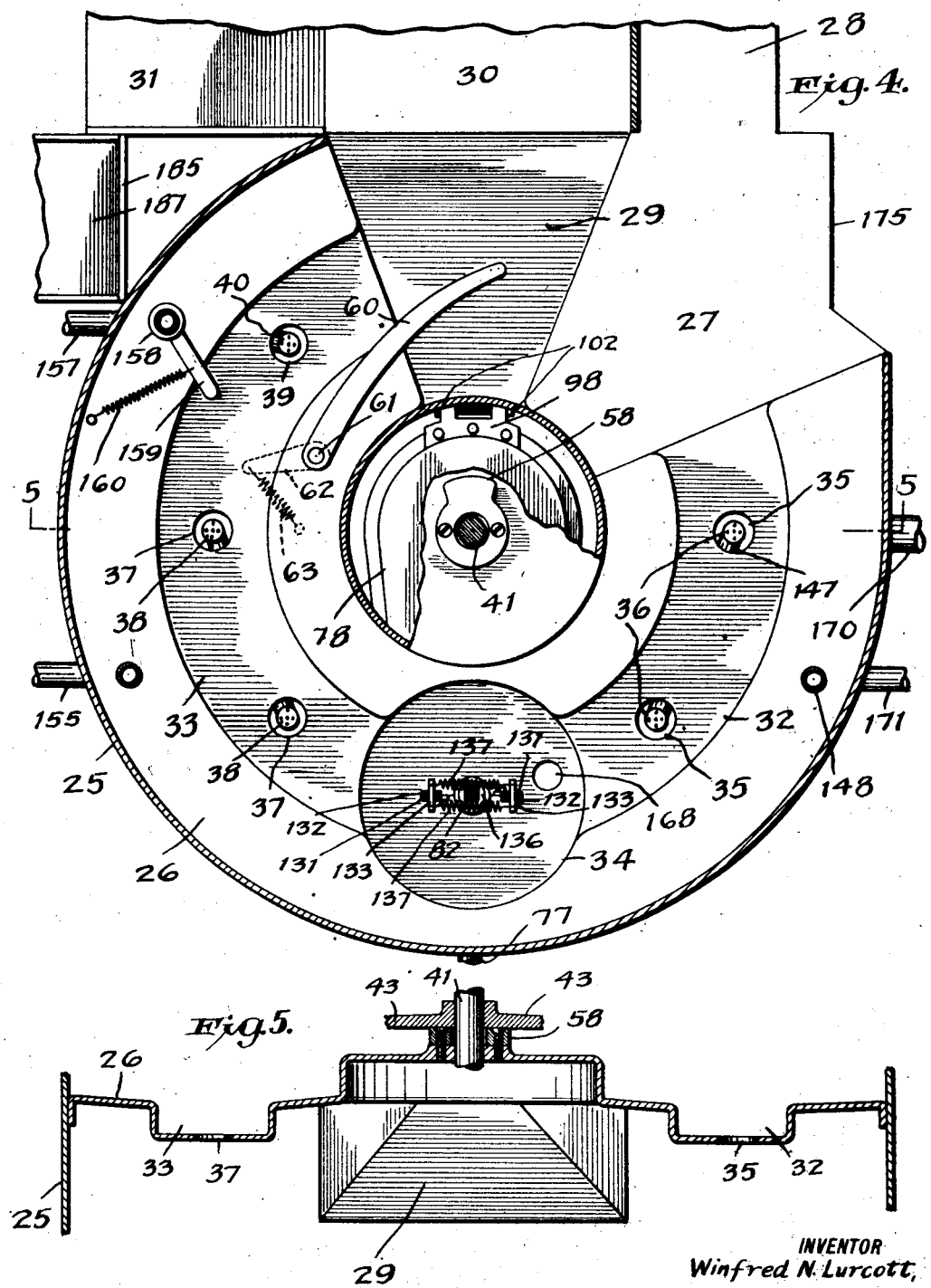

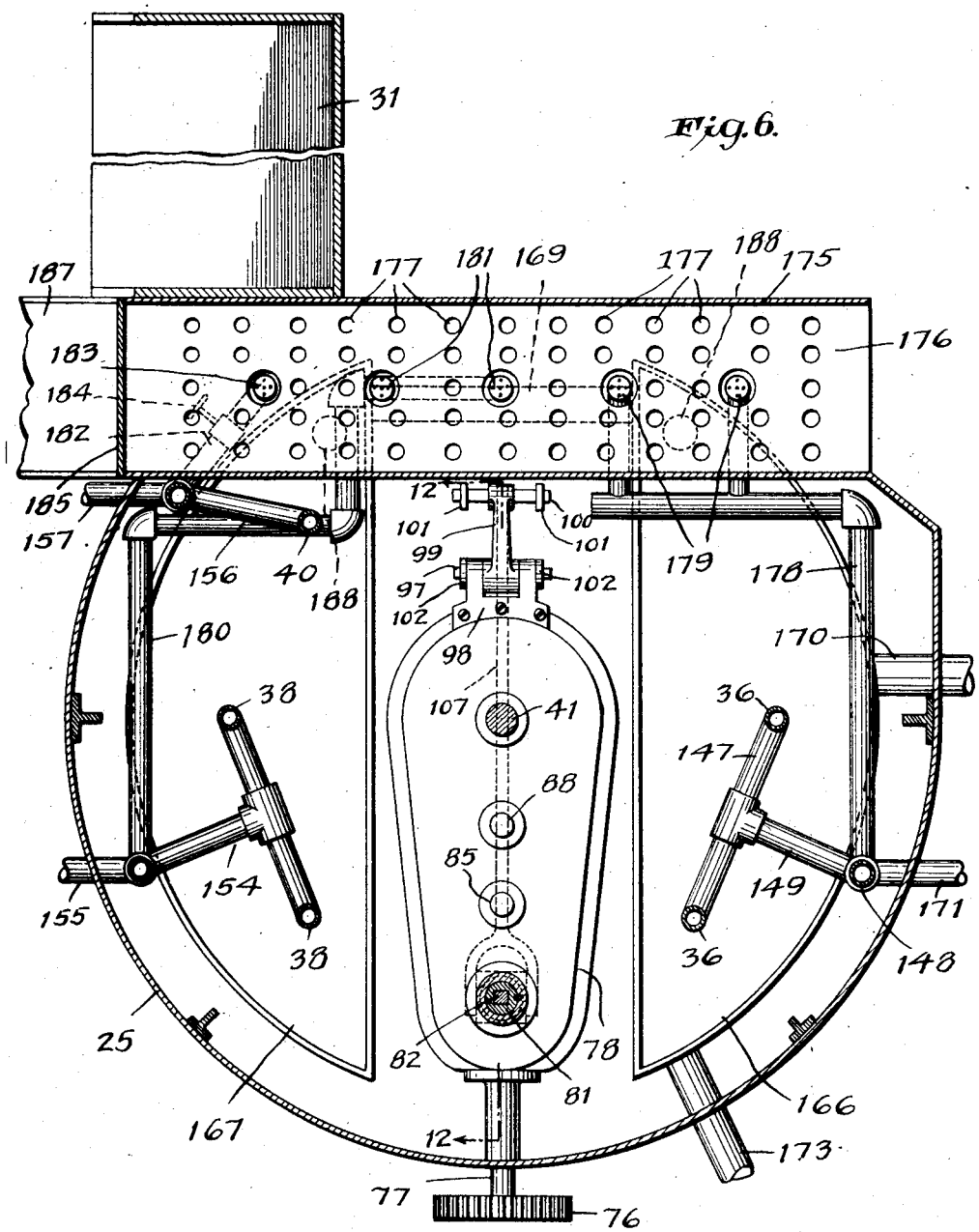

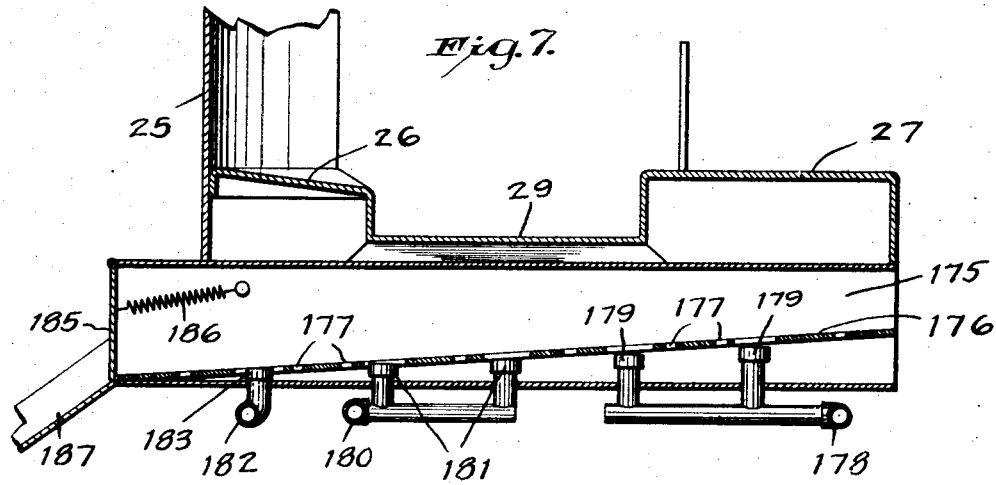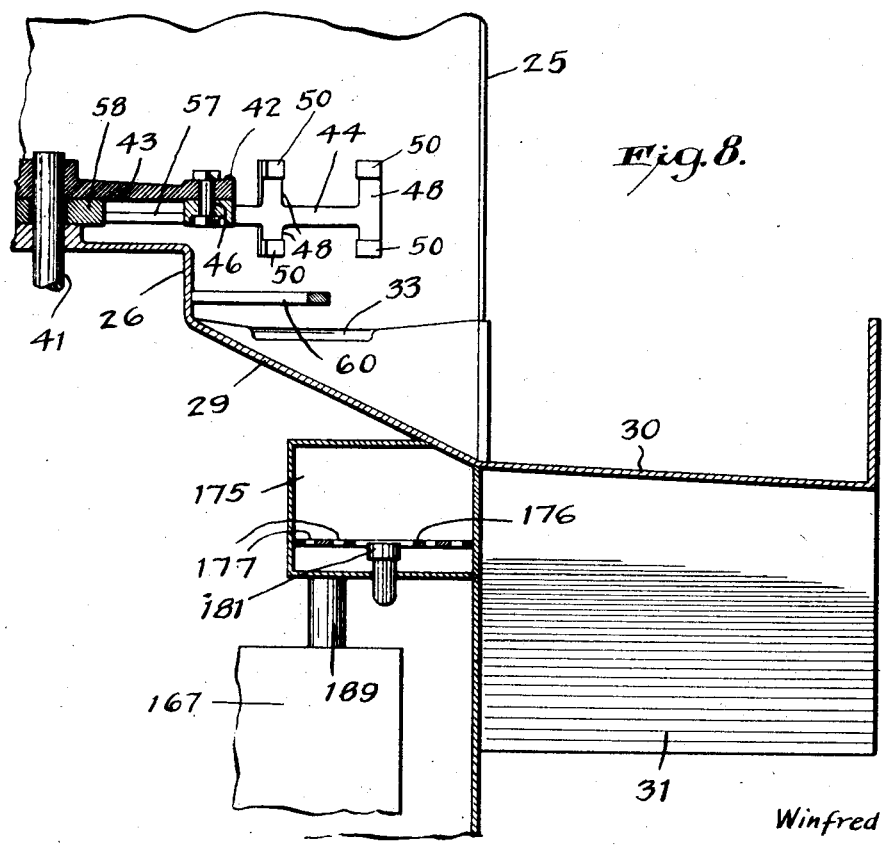

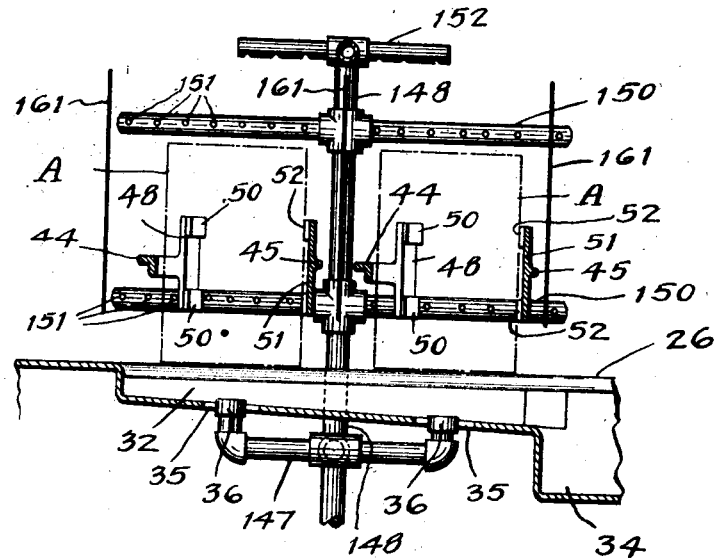
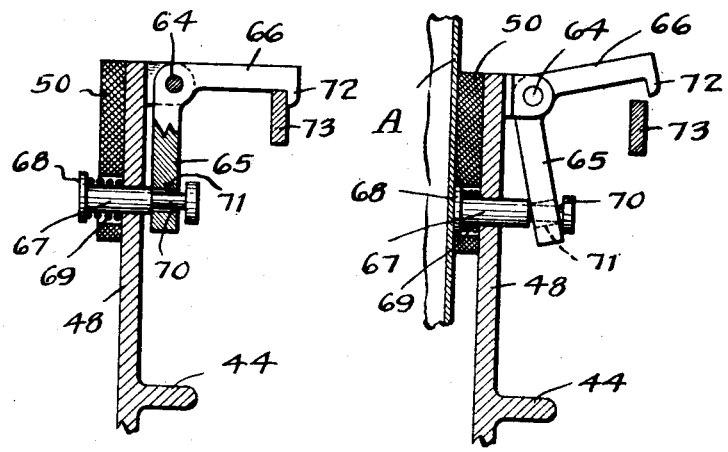

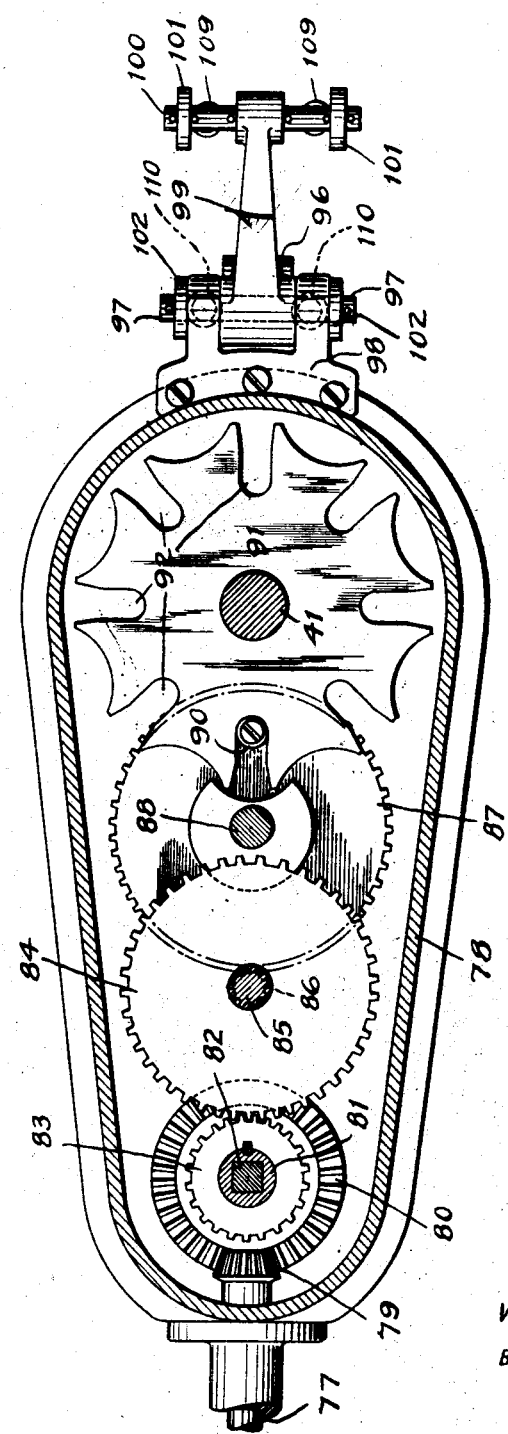

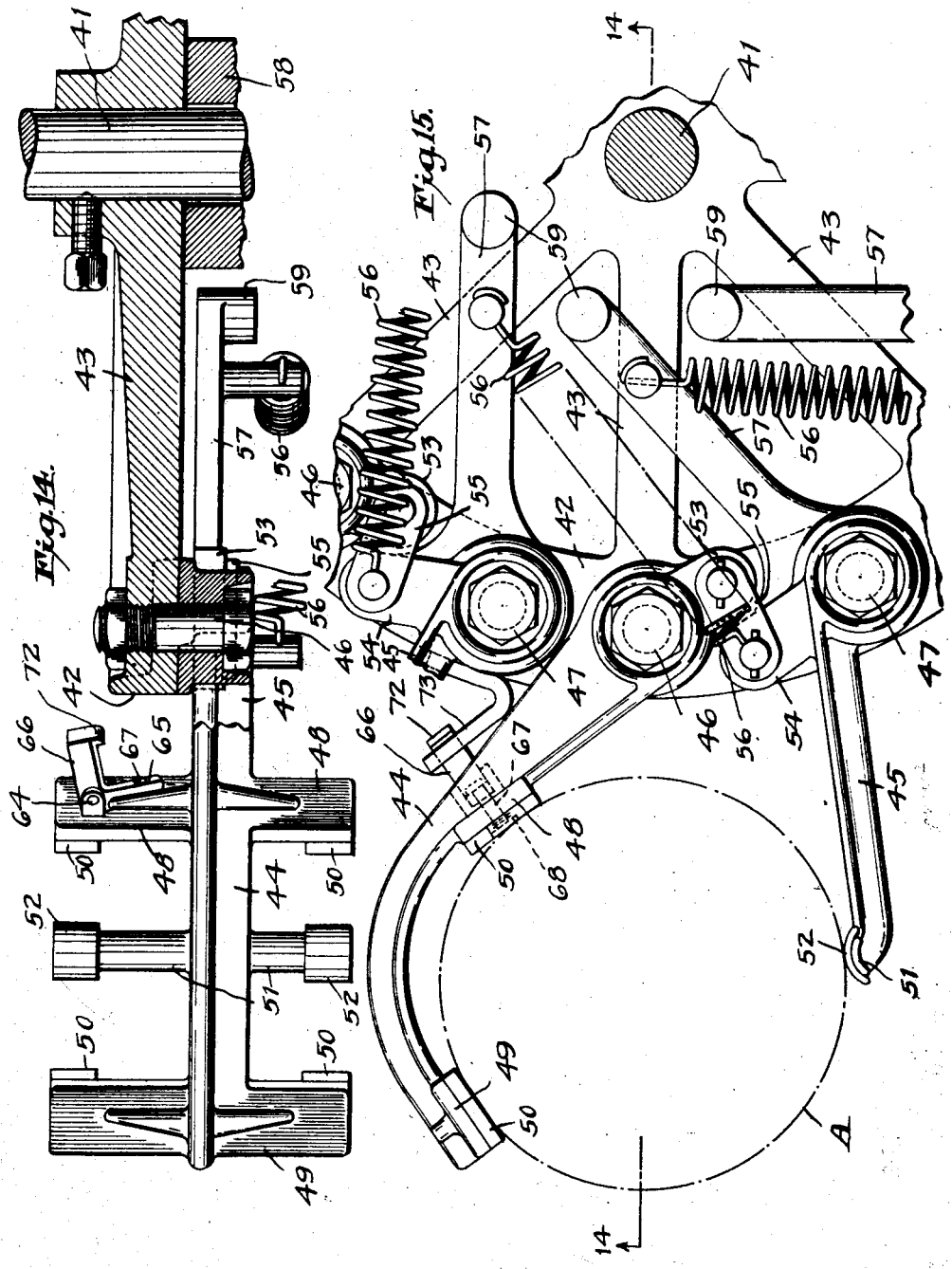

INVENTOR
Winfred N. Lurcott,
BY
HIS ATTORNEY

May 21, 1929. W. N. LURCOTT 1,713,973
RECEPTACLE WASHING MACHINE
Filed July 19, 1926 14 Sheets-Sheet 14
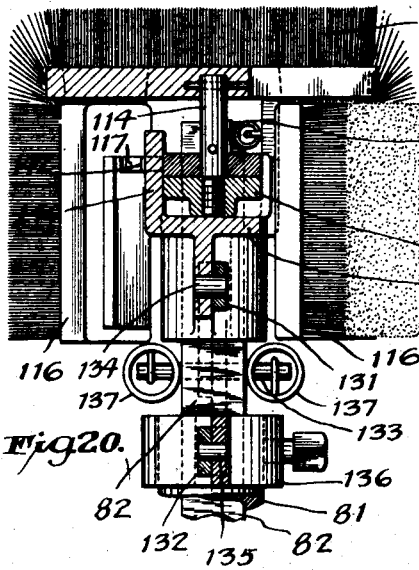
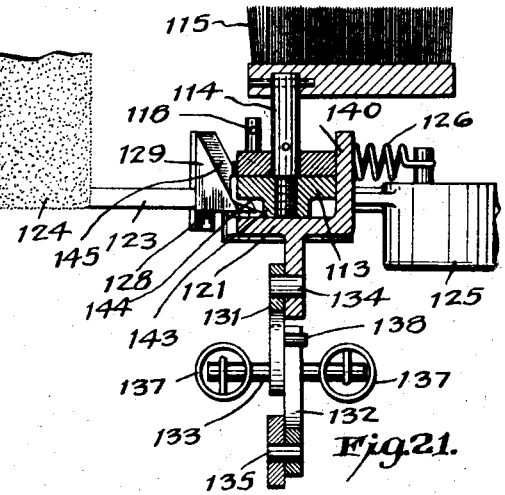
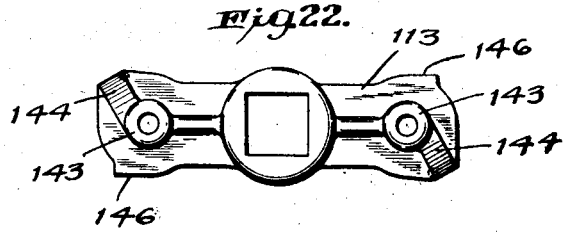
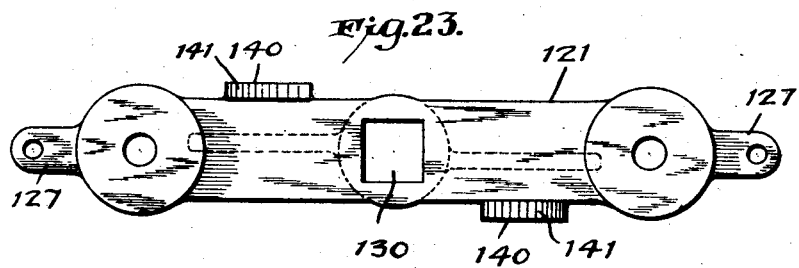
INVENTOR
Winfred N. Lurcott,
BY
HIS ATTORNEY Patented May 21, 1929.

1,713,973

UNITED STATES PATENT OFFICE.

WINFRED N. LURCOTT, OF ELIZABETH, NEW JERSEY, ASSIGNOR TO ALBERT McDOUGAL, OF NEW YORK, N. Y.

RECEPTACLE-WASHING MACHINE.

Application filed July 19, 1926. Serial No. 123,378.

This invention relates to the art of receptacle washing machines and particularly refers to machines for washing, scrubbing, sterilizing and drying ice cream cans and their covers.

Ice cream cans, due to their contents and the careless manner in which they are handled and treated, become foul, filthy and rancid, and it is essential that they be thoroughly cleaned, sterilized and dried before using again. The cans are of different diameters and different heights.

The objects of the invention are to provide a machine that will cleanse the cans in an efficient manner and will take care of all the different sizes of cans used by the ordinary ice cream manufacturer; to eliminate handling of the cans manually, by providing a machine that produces sanitary conditions and saves a great amount of labor in addition to cleaning the cans more thoroughly than they would be cleaned by hand operation; to provide a machine which has an intermittently rotated carrier, having mounted on it a plurality of clutches which are adapted to grasp and center cans of different diameters; to provide means for holding the cans rigidly while a cleansing solution is sprayed on them, and then positioning the cans, while still firmly held, over a plurality of rotating brushes which reciprocate within the cans and scrub and clean them on the way in and also on the way out; to provide holding means compensating for cans of different heights; and to provide means enabling the cans to advance, while still held rigidly, to stations where they are rinsed and dried and released and ejected from the machine.

With the above objects in view and others which will be detailed during the course of this description, my invention consists in the parts, features, elements and combinations thereof hereinafter described and claimed.

In order that my invention may be clearly understood, I have provided drawings showing an embodiment thereof, and in said drawings:

Figure 3 is a sectional plan view taken on the line 3—3 of Figure 1;

Figure 4 is a sectional plan view taken on the line 4—4 of Figure 1;

Figure 5 is a fragmentary detail sectional view taken on the line 5—5 of Figure 4;

Figure 6 is a sectional plan view taken on the line 6—6 of Figure 1;

Figure 7 is a fragmentary detail sectional view taken on line 7—7 of Figure 2;

Figure 8 is a fragmentary detail sectional view taken on the line 8—8 of Figure 2;

Figure 9 is a fragmentary detail sectional view taken on the line 9—9 of Figure 3;

Figures 10 and 11 are detail sectional views, on a larger scale, showing in two positions the mechanism that holds the clutches open for reception of the cans;

Figure 12 is a detail sectional view, on a larger scale, showing the driving mechanism, this view being taken on the line 12—12 of Figure 6;

Figure 13 is a sectional plan view of the drive shown in Figure 12 and taken on the line 13—13 of Figure 12;

Figure 14 is a fragmentary detail sectional view, on a larger scale, taken on line 14—14 of Figure 15 and showing one of the clutches and part of its carrier;

Figure 15 is a bottom plan view of the parts shown in Figure 14;

Figure 20 is a detail sectional view on the line 20—20 of Figure 18, looking in the direction of the arrow;

Figure 21 is a detail sectional view taken on the same line as Figure 20, but looking in the opposite direction;

Figure 22 is a detail plan view of the crosshead carrying the upper brushes; and Figure 23 is a detail plan view of the crosshead carrying the lower brushes.

Figure 1:
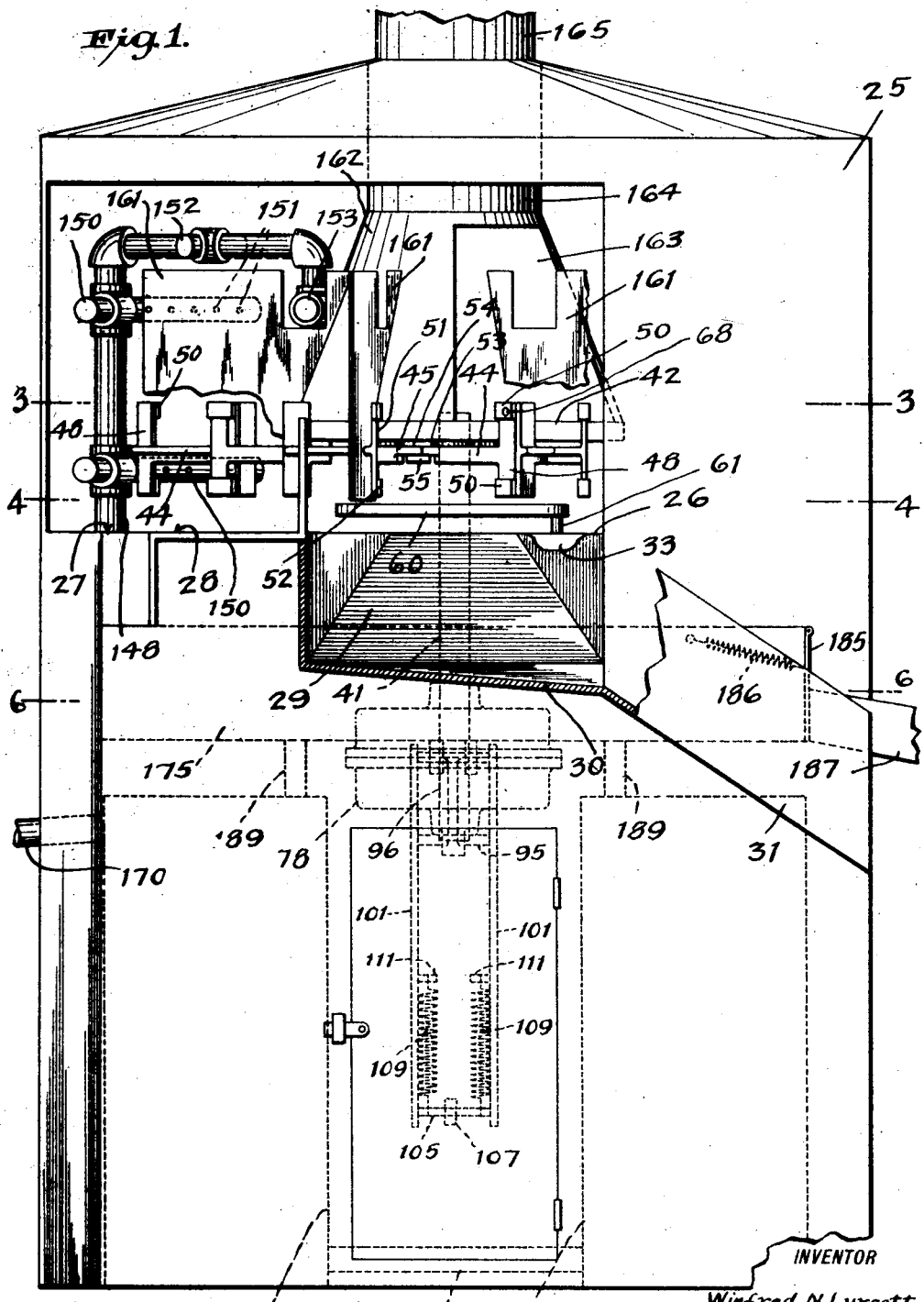
Figure 1 is a view in elevation of the machine looking toward the discharge end thereof.

Referring to the drawings, the reference numeral 25 designates the casing of the machine. Mounted in and partially inclosed by the casing, and at a suitable height above the floor is a drain table 26. The larger part of this table acts as a drain, and the balance as a loading platform and discharge chute. The loading platform is indicated at 27 and has a ledge 28 extending laterally therefrom in the same plane, upon which several soiled cans may be lined up, as shown by broken lines A in Figure 3, prior to placing them in the machine. Adjacent the loading platform is the inclined chute 29 where the clean cans are discharged from the machine. From the chute 29 the cans slide to a slightly sloped platform 30, and thence to another chute 31, where they may be discharged onto the floor, a hand truck, a conveyor or any convenient place.

The drain table has a pair of troughs 32 and 33, which slope toward and lead into a well 34, so that liquid will drain in said well 34. The floor portions of the drain table, adjacent and on both sides of the troughs, slope toward the troughs, as shown in Figure 5, thus insuring complete drainage. The trough 32 has two openings 35 through which project nozzles 36 for supplying jets or a spray of cleaning solution on the interior of the cans when they are brought over the nozzles by mechanism which will be described later. Rotating brushes, which will also be described later, are positioned on a shaft having its axis central in relation to the well. The trough 33 has two openings 37 through which project nozzles 38, that supply hot water or steam heavily charged with moisture. Thus, after the cans have been sprayed by a cleaning solution from the nozzles 36 and scrubbed by the brushes, they are thoroughly rinsed by the discharge from the nozzles 38. Another opening 39 is provided in the trough 33 and has a nozzle 40 projecting through it. This nozzle supplies dry steam, or some other drying agent, for thoroughly drying the cans. They are then discharged into the chute 29.

From the foregoing it will be observed that a station for loading the cans is provided, together with a station where a cleaning solution is sprayed on the cans, a station where the cans are scrubbed, a station where they are rinsed, a station where they are dried, and lastly a station where they are discharged.

A carrier, with a plurality of clutches adapted to center cans of different sizes, is provided and this will now be described. A central shaft 41 has secured to it a heavy ring 42, which is supported by the radiating arms 43. The shaft is intermittently rotated by suitable mechanism hereinafter described. The ring 42 acts as the carrier and has the clutches mounted on it. The clutches, as shown particularly in Figures 3, 14 and 15, comprise pairs of arms 44 and 45, pivoted at 46 and 47, respectively, to the ring 42. The arm 44 of each pair is curved and has extensions 48 and 49 upon which are mounted friction pads 50. These pads may extend the entire length of the extensions instead of being at the top and bottom, as shown, in order to give a firmer grip on the cans. The arms 45 have extensions 51 upon which are secured friction pads 52. It will thus be seen that a three-point contact is provided for firmly gripping the cans.

The arms 44 have short projections 53 from their hubs (see Figure 15), and the arms 45 have similar projections 54. These projections 53 and 54 are connected by the link 55, and the arrangement is such that, when the arm 45 is moved outward or inward, the other arm 44 of the pair moves in the same way. Thus a clutch is provided which will readily grasp cans of varying diameters, and the central axis of the can will always be in the same position, regardless of its diameter. This is important, because, once the can is placed in its clutch, it is not removed until cleaned and it must always be maintained in a fixed position to the cleaning means for proper results. The arms of each clutch are forced together by a strong spring 56, secured at one end to the link pivot pin on the projection 54 of the arms 45 and to a tail 57 on the arm 45 of the adjacent clutch. The clutch arms being connected by the link 55, the spring will force the arms of each pair to move toward each other and firmly grip the can.

Means are provided for opening the clutches so that the cans may be readily inserted from the loading platform and discharged after they are cleaned. A cam 58, which is secured to a boss on the drain table, cooperates with the ends 59 on the tail pieces 57 of the arms 45. As the carrier is rotated and the cans approach the discharge station, the ends 59 of the tail pieces ride up on the cam 58 and the arms of the clutch are opened. The can being released over the sloping discharge chute 29, naturally runs down this chute and out of the machine. However, to insure its leaving the machine, positive means are provided for ejecting the can. This means comprises a lever 60 which is pivoted on a rod 61, mounted in the drain table. Beneath the drain table and secured to the lower end of this rod 61 is a tail 62, Figure 4, which has a spring 63 secured to it and to a stud on the lower side of the drain table. The spring normally tends to force the lever 60 outwardly from the central axis of the machine. As the cans are brought around by the carrier, the arm 60 will be forced toward the center of the machine by the can and the spring will be tensioned. Immediately upon the opening of the clutch, the spring will shift the arm 60 to positively eject the can.

After the can has been discharged, the end 59 of the tail 57 remains on the cam 58 until the empty clutch arrives at the loading station, thus keeping the clutch open so that another can may be easily inserted from the loading platform. As the can is leaving the loading platform, the end 59 of the tail rides off the cam and the spring 56 comes into action and causes the two arms of the clutch to firmly grip the can, and the can remains in the grip of the clutch until it has been cleaned and dried.

Means of a simple character are provided to prevent the clutches from closing if a can is not placed between their arms. This is done so as to prevent the brushes from being injured by the arms of the clutch with which they would come in contact if a can were not placed in the clutches to keep the arms of the clutches apart. Pivoted at 64, Figures 10, 11 and 14, on each one of the extensions 48 from the arms 44 is a latch which has two arms 65 and 66 at right-angles to each other. Slidably mounted in the extension 44 is a stud 67 provided at one end with thin flat head 68 for engaging with the can when the can is placed in the clutch. As shown in Figure 10, a spring 69 normally holds the head 68 of the stud 67 in a position to be engaged by the can entering a clutch. The end of the stud 67 opposite the head 68 has a reduced or neck portion 70 which passes through an aperture 71 in the arm 65 of the latch. The other arm 66 of the latch has a depending portion 72 adapted for engagement with projections 73 on the carrier ring 42. When the clutches are opened by the cam 58 and the can is discharged, the parts will normally occupy the position shown in Figure 10. If they pass the loading station and a can is not inserted, the parts will maintain that position and the clutches will be held open. However, when the can is inserted at the loading station, the head 68 on the stud will be engaged by the can and the stud will cause the latch to be freed from the projection 72, as shown in Figure 11. Other ways might be devised for accomplishing the foregoing result.

The driving mechanism for the machine will now be described. A motor 74, Figure 1, is mounted on a bracket secured to the casing and has a pinion 75 which engages with a spur gear 76, secured to a shaft 77, which enters a transmission case 78 (see Figures 12 and 13), and has secured to its inner end a bevel pinion 79, meshing with a bevel gear 80, keyed to a sleeve 81, which has its bearings in the transmission case 78. The bore of the sleeve 81 is square to accommodate the square shaft 82, which is slidably mounted therein and forms the driving means for the brushes which will be described hereinafter.

Pinned or otherwise secured to the sleeve 81 is a pinion 83 which meshes with the gear 84 on the shaft 85, having its bearings in the transmission case. This shaft 85 has teeth 86 cut in it below gear 84, and said teeth mesh with and drive a large gear 87 which is keyed or otherwise secured to a shaft 88 having bearings in the transmission case and carrying at its lower end a crank 89, the function of which will be described later.

Mounted on the gear 87 is a roller 90 forming part of a Geneva movement by which the carrier is intermittently rotated. A disk 91 is secured to the carrier shaft 41 and is provided with the slots 92 for engagement with the roller 90. From the foregoing it can readily be seen that the square shaft 82 carrying the brushes is continuously rotated and the shaft 41, having the carrier mounted on its upper end, is rotated step by step.

Means, in connection with the driving mechanism, are provided for raising and lowering the square shaft 82, carrying the brushes. The crank 89 has a connecting rod 93 pivoted thereto at 94, Figure 12, which at its opposite end 95 is pivoted to one arm 96 of a bell-crank lever which in turn is pivoted at 97 to a bracket 98 secured to the transmission case. The other arm 99 of the bell-crank lever has secured in its end a short rod 100, on which are pivoted a pair of depending members 101. The pivot 97 on the bracket 98 is formed by a similar rod, to which is pivoted another pair of depending members 102. These depending members 101 and 102 have slots 103 and 104 at their lower ends, and short rods or pins 105 and 106 pass through said slots. Pivoted on the rods 105 and 106 is a lever 107 having its opposite end 108 pivoted to the lower end of the square shaft 82. The pins 105 and 106 are held in the upper part of the slots 103 and 104 by springs 109 and 110 secured to pins 111 and 112 mounted on the depending members 101 and 102, respectively.

In operation, the connecting rod 93 will move the arm 96 of the bell-crank lever to the left, from the position of Figure 12. This will cause the arm 99 to be forced downwardly and move the depending members 101 downwardly. The depending members 102 being pivoted on the pin 97 will cause the pin 106 to act as a fulcrum for the lever 107. The distance from 106 to 105 will be the length of the short arm of the lever and from 106 to 108 the long arm. As the pivot 105 is depressed, it will cause the opposite end of the lever to raise the square brush driving shaft 82. As the shaft 82 raises, if its upper part strikes any obstruction, such as the bottoms of cans of different heights, the springs 110 will give and the pins 106 will be forced downwardly in the slots 104. Thus, a yielding pressure is always maintained for forcing the brush shaft 82 upwardly and for compensating for cans of varying heights. The square shaft 82 being slidably mounted in the sleeve 81 is always free to move up and down, yet will always be rotated by virtue of its square section engaging the squared hole in the sleeve 81. The movement of the parts is so timed that, when the mechanism is in the position shown in Figures 12 and 13 and the carrier is being moved from one station to another, the brush-shaft is in its lowermost position to insure against any interference or contact of the brushes with the moving parts of the carrier, and to insure the brushes being completely withdrawn from the can before the can is moved to its next station. To make absolutely certain of the cans having ample time to get away after being brushed and other cans being positioned, without interfering with the brush mechanism, the parts are arranged so that the crank 93 continues to move the bell-crank lever after the brush mechanism, hereinafter described, reaches its lowermost position. This condition is particularly illustrated in Figure 12 which shows the position of the parts when the brushes are in their lowest position. The arm 99 of the bell-crank lever has raised the depending member 101 to its highest point. Just prior to reaching this point the brushes had reached their lowest position. As the arm 99 continues to move upward a slight amount after the brushes are bottomed the spring 109 stretches and the pin 105 remains stationary. The slot 103 permits the pin to maintain its position at this time. Therefore while the carrier is being moved there is no possibility of the brushes interfering with the can that is leaving the station or one approaching and a very simple mechanism is thus provided for taking care of this condition and in addition providing means for forcing the brushes to contact with the inside bottoms of cans of different heights. It will be noted that the Geneva movement is so arranged that, during one complete revolution of the shaft 88, which carries the crank for raising and lowering the brush shaft, the roller 90 is in its slot for only a small part of this revolution, thus insuring a rapid movement of the carrier and ample time for the brushes to operate.

The brushes and their associated operating mechanism, illustrated particularly in Figures 16 to 23, inclusive, will now be described. The square brush-shaft 82 previously mentioned has secured to its upper end a cross-head 113, a top plan view of which is shown in Figure 22. This cross-head has a pair of studs 114 mounted in its opposite ends, which carry a brush 115 of quite a substantial area. This brush 115 is the one that is utilized for cleaning and scrubbing the major portion of the inside bottom of the can. As previously explained, this brush is forced yieldingly against the inside bottom of the can by the springs 109 and 110, and, when cans of a short depth are encountered, the pins 106, Figure 12, will be forced downwardly in the slots 104 and thus readily adapt the brush to clean the inside bottoms of cans of different heights. The cross-head 113 also carries brushes 116 for cleaning the inner side walls of the can and assisting in cleaning the inside bottom of the can. These brushes 116 are carried by arms 117 which are pivoted on the studs 114. The brushes 116 have bristles on their outer faces for cleaning the interior walls of the can and on their top edges for cooperating with the brush 115 for cleaning the inside bottom. The bristles on the top edge will spread over the balance of the area of the inside bottom not covered by the brush 115, and thus thoroughly clean and scrub all parts of the inside bottom of cans of different heights and different diameters. The brushes 116 are adapted to clean cans of varying diameters and for this purpose are mounted to be forced outwardly against the interior wall of the can (see Figure 16) by centrifugal force, and by springs 118 which are secured to pins on the arms 117 and other pins on the cross-head 113. In order to prevent the brushes 115 swinging out beyond the limits of the largest diameter can, pins 119 on the movable members 117 will abut against pins 120, mounted on the cross-head 113, when the brushes have been moved the maximum amount.

Figure 17:
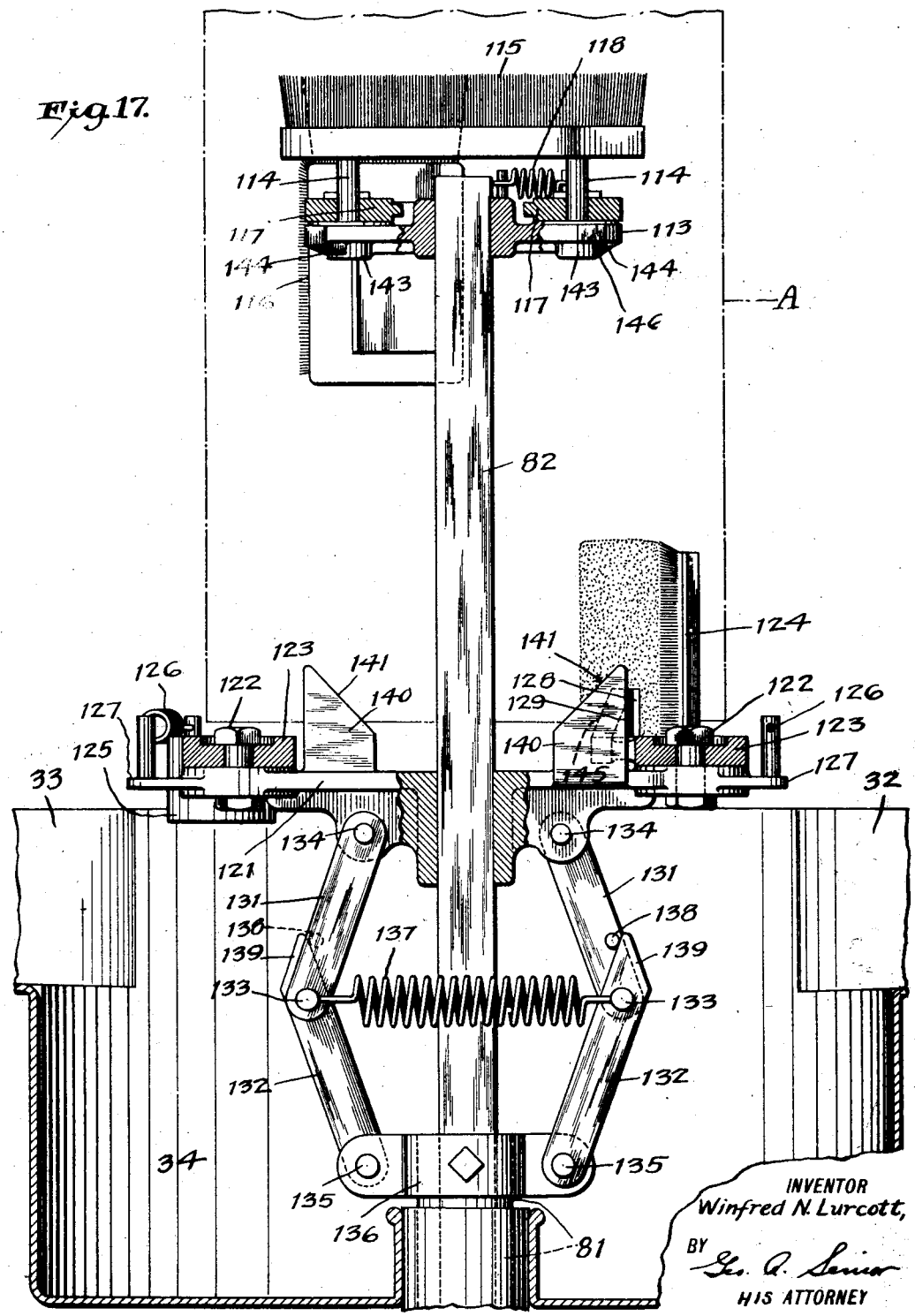
Figure 17 is a view in elevation with parts in section of the mechanism shown in Figure 16, the parts being in the same position.

Another cross-head 121 is positioned below the cross-head 113, and has pivoted to it at 122 arms 123 which carry at one end brushes 124 and at the opposite end weights 125. The brushes 124 are adapted to clean the outer neck of different diameter cans, and from an inspection of the drawings it will be clear that the weighted ends 125 of the arms 123 will, by centrifugal force, tend to throw the brushes 124 inward. In addition to the centrifugal force, strong springs 126, secured at one end to pins on extensions 127 from the cross-head 121 and at their other ends to pins on the weighted parts 125 of the arms 123, will force the brushes 124 against the outer neck of cans of different diameters. Stops are provided for limiting the inward movement of the brushes 124 beyond the diameter of the smallest size can it is desired to operate on. These stops comprise depending fingers 128 secured to lugs 129 extending from the hubs of the arms 123. These stops will abut against the edge of the cross-head 121 when the maximum inward movement of the brushes 124 has been attained. The cross-head 121 has a square hole 130 which provides a sliding fit for the square shaft 82. In this way the cross-head and brushes 124 are always rotated by the drive-shaft 82, but not carried up and down with it. The means for raising the cross-head 121 consists of two pairs of levers 131 and 132 pivoted together at 133. The levers 131 are pivoted at 134 to depending ribs from the cross-head 121, and the levers 132 are pivoted at 135 to ears on a collar 136 which is fixed to the upper end of the sleeve 81. As this sleeve 81 rotates with the shaft 82, the levers 131 and 132 and their associated parts rotate with the shaft and with the cross-head 121. Heavy springs 137 are connected to the pins forming the pivots 133 of the levers 131 and 132, which normally tend to straighten the levers 131 and 132, as shown in Figure 17, and thus keep the brushes 124 operating in their proper positions on the outer neck of the can. Stop pins 138 on the levers 131 and flanges 139 on the levers 132 limit the movement of the levers and the upward movement of the cross-head 121.

Figure 19:
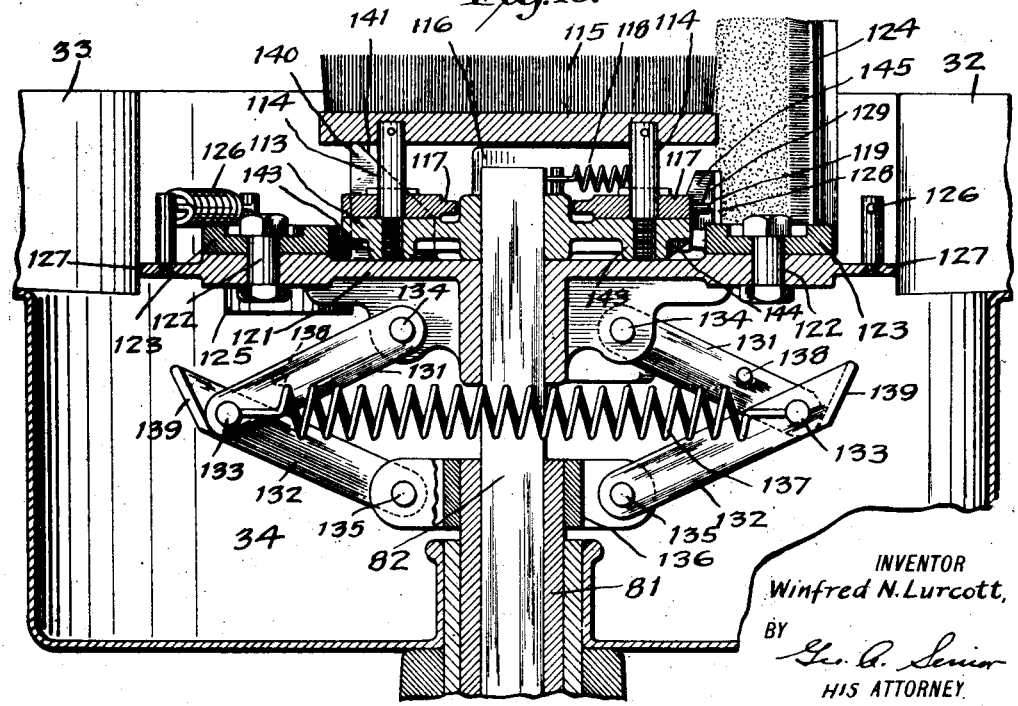
Figure 19 is a sectional view of the same parts illustrated in Figures 16, 17 and 18, and with the parts in the position of Figure 18.

It will be noted that the axis of the brush-shaft is central in the well 34. When the machine is in operation and the bulk of the cleaning and rinsing solutions is being drained from the drain table and troughs into the well, as previously explained, the well 34 will remain substantially full of liquid. Thus the brushes, when they are lowered, will be saturated so that, when they are raised into the can, they will thoroughly scrub and clean it. The driving mechanism heretofore explained raises and lowers the shaft 82. It is necessary, after the can has been cleaned, that all the brushes be lowered into the well 34, as shown in Figure 19, so as to permit the can that has been cleaned to be moved to the next station and allow the next can that is to be cleaned to be positioned over the brushes. The brush 115 and the brushes 116, being mounted on the cross-head 113, and the cross-head fixed on the shaft 82, will descend with said shaft.

Figure 18:
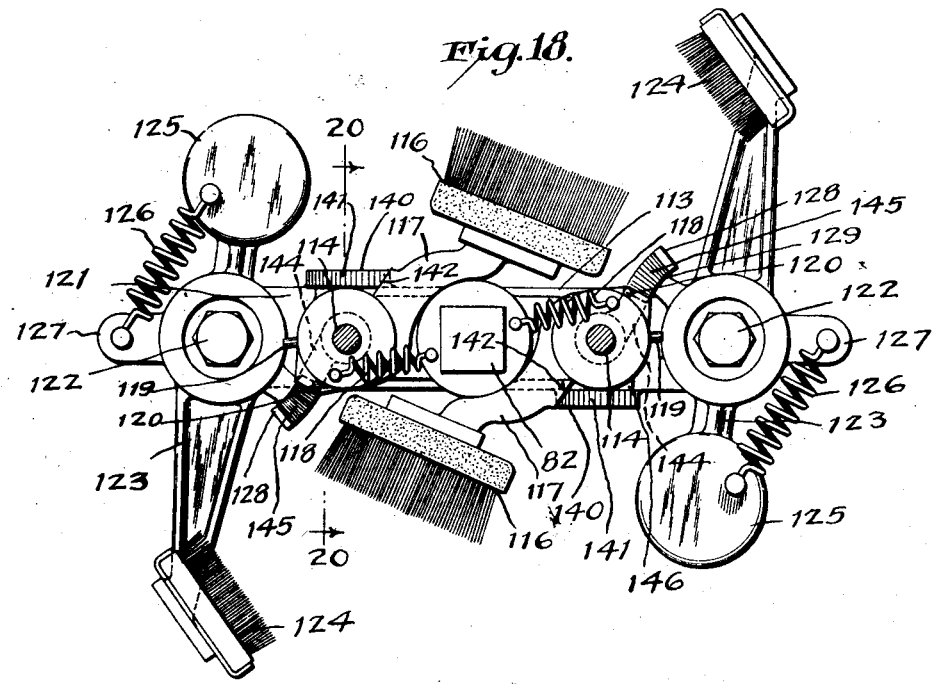
Figure 18 is a view similar to Figure 16, but showing the position the parts will assume after the brushes have been withdrawn from the can, and the can has been cleaned and is moving to its next station.

Means are provided for causing the cross-head 121 and its associated parts to descend and for causing the brushes 116 to be drawn in away from the interior wall of the can, and the brushes 124 to be withdrawn from the neck of the can. This means will now be described. Extensions 140 on the cross-head 121 have cam faces 141 to cooperate with the edges 142 of the arms 117 which carry the brushes 116. When the shaft 82 and cross-head 113 are lowered a sufficient amount, the cam faces 141 engage the parts 142 of the arms 117 and the brushes 116 are forced inwardly so as to rest against the brush 115, as shown in Figure 18. The cross-head 113 has bosses 143 and extending therefrom to the outer periphery are thickened, sloped portions 144 which engage with cam surfaces 145 on the lugs 129 previously mentioned. Thus, as the cam faces 141 are engaging the parts 142, the portions 144 on the cross-head 113 are cooperating with the cams 145 on the lugs 129, and forcing the brushes 124 away from the outer neck of the can, as shown in Figure 18. As the shaft 82 and its cross-head 113 are lowered and as explained the brushes for the interior of the can are withdrawn from engagement with the can by the cams 141, and the brushes for the outer neck are drawn away from the can by the cams 145, the heavy springs 137 will hold the cross-head in place until the bosses 143 and the hub on the cross-head 113 come in contact with the cross-head 121. The cross-head 121 will then be forced downwardly, as shown in Figure 19.

When a can to be cleaned is positioned over the brushes and the shaft 82 carrying the brushes starts to ascend, the springs 137 will pull the levers 131 and 132 toward each other and hold the cross-head 121 against the cross-head 113, thus keeping the brushes entirely out of engagement with the can until part of the inner brushes have entered the mouth of the can and part of the outer brushes have passed the outer neck of the can. By this time the cross-head 121 will have reached the limit of its upward movement and the cams 141 and 145 will have released the brushes so that the centrifugal force and springs will force the brushes into contact with the surfaces of the can so as to clean it. In this way a very simple and efficient mechanism is provided for keeping the brushes from interference with the can until they are in proper position to clean the can. The outer edges of the cross-head 113, at opposite sides, are flattened or have bosses 146 which cooperate with or engage the inner sides of the extensions 140 when the brushes are lowered and the two cross-heads 113 and 121 are adjacent each other. In case of any play in the parts, this will insure the upper cross-head being positioned properly in relation to the one beneath, when the parts are lowered in the well 34.

In addition to the nozzles 36 for spraying cleansing solution into the interior of the cans, means are provided for spraying the solution on the exterior and top. The nozzles 36 rise from a cross-pipe 147 which is connected to the main supply pipe 148 by a branch 149, Figures 3, 6 and 9. This main supply pipe 148 extends upwards and has two pairs of curved extensions 150 having holes 151 for spraying the outside of the can. The pipe 148 continues on up and across and at its intermediate cross portion, over the top of the cans, has branches 152 having perforations (see Figures 1 and 9) to supply downward jets. Another curved branch 153 opposite the upper curved extension 150 sprays one side of the cans. After the cans have been sprayed in this fashion by a cleansing solution, the dirt is softened and easily removed by the brushes. After the brushes have cleaned the cans, a similar arrangement of piping 154 acts in conjunction with the nozzles 38 for spraying a rinsing solution on the cans. This rinsing solution consists of intensely hot water or steam heavily charged with moisture which may be supplied from an outside source through the pipe 155.

A somewhat simpler arrangement of piping 156 constructed similarly acts in connection with the nozzle 40 for supplying dry steam or some other drying agent to dry the cans after they have been cleaned. The dry steam is also supplied from an outside source through the pipe 157. A valve 158, Figures 3 and 4, is provided in the dry steam line for automatically cutting off the steam if a can is not presented at this station. The valve has a lever 159 which normally holds it closed through the agency of the spring 160. When a can approaches this station, it moves the lever 159 to the position shown in Figure 3 and opens the valve, holding it open as long as the can stays at the station. When the can passes, the valve is closed by the spring 160, and the next can reopens it. Obviously, if no can is presented at the station, the valve remains closed. Means are provided for forming separate compartments or chambers at each station and for withdrawing the vapor and steam in the casing. This is done largely for the protection of the operator, so as to eliminate chances of his being harmed by the hot water or steam. Baffle plates 161 are secured between each one of the clutches and are carried by the ring 42 so as to turn with it. These baffle plates form separate compartments for each station and are of sufficient area to protect the operator from the hot water or steam. They may be cut out at appropriate places for any mechanism that may interfere with them.

Figure 2:
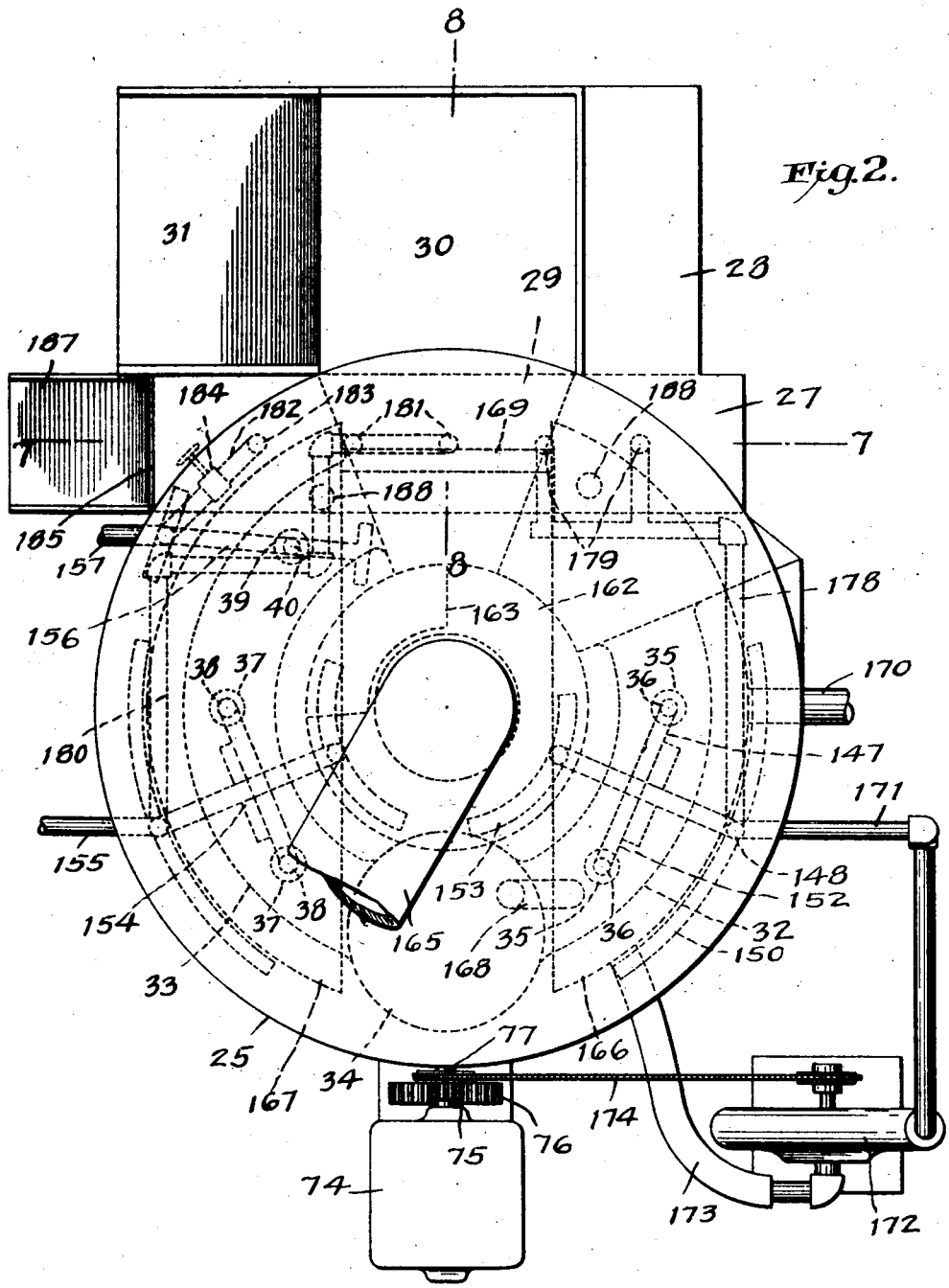
Figure 2 is a top plan view, on a slightly smaller scale, of the machine shown in Figure 1.
Figure 16:
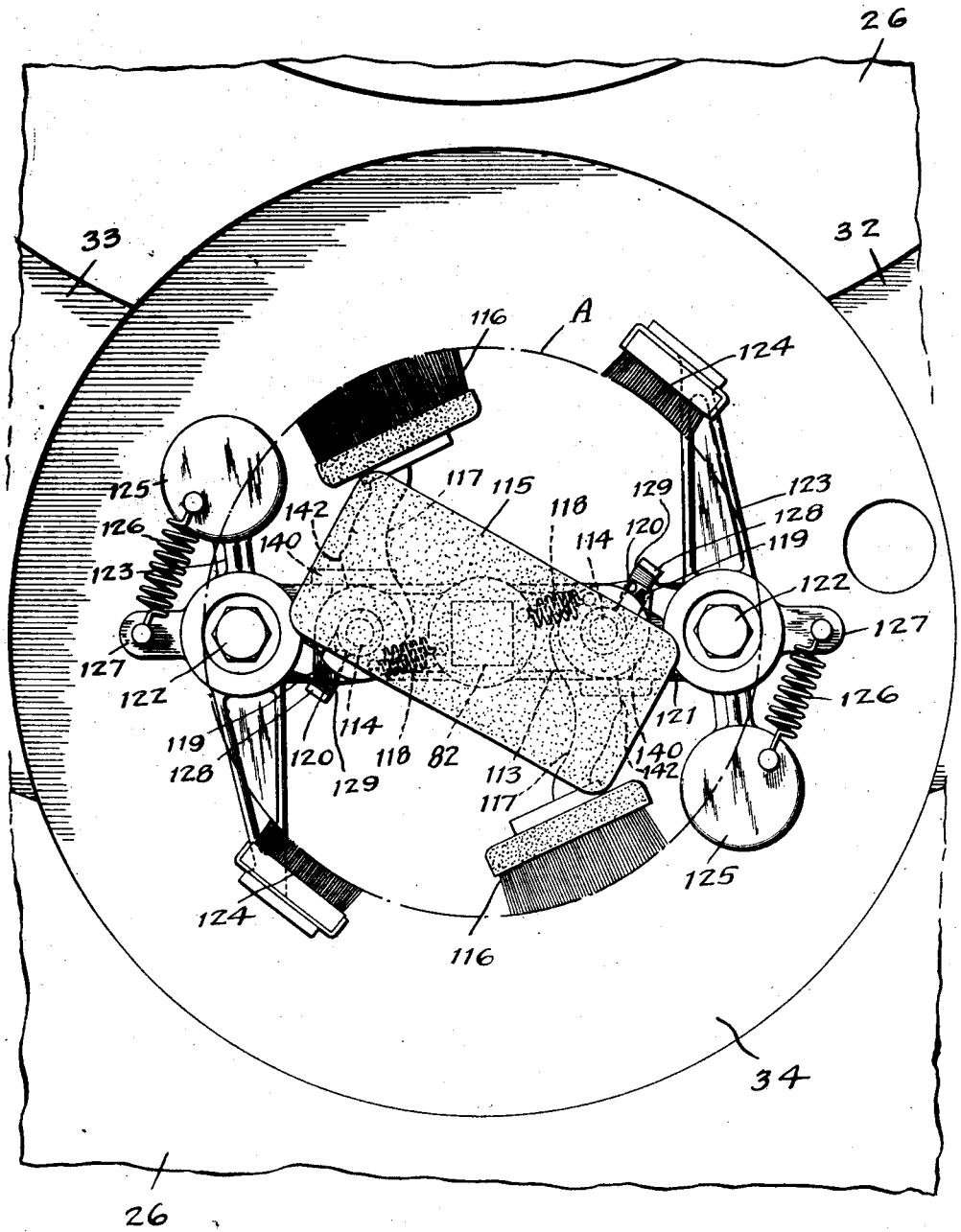
Figure 16 is a plan view, on a larger scale, of the brushes for cleaning the can, this view showing the parts in the position they will assume while the can is being cleaned.

A funnel 162 is mounted over the carrier and has a large opening 163. It is connected to the top of the casing by a pipe 164 and another pipe 165 leads from the outside of the casing to a blower or stack. The vapors are drawn through the opening 163 and thence out of the machine by the aforesaid piping. As previously explained, all parts of the drain table slope toward the trough 32 and 33 and drain into the well 34. Large tanks 166 and 167, Figure 1, are located under the drain table. Some of the water and cleaning liquid will escape into the tanks through the openings 35, 37 and 39; but, the major part of it will drain into the well 34 and thence by outlet and pipe 168 into the tank 166, Figure 2. The solution that drains into the tank 166 from the well will be impregnated with grease and dirt, and that which drains through the openings 37 into the tank 167 will be comparatively clean. The tanks 166 and 167 are connected together at their lower part by a pipe 169, and the same level will thus be kept in each of the tanks. The dirt and grease will naturally rise to the top of the tank 166 where it will be drained off the top through a pipe 170. The water or steam and water supplied by the piping 154 will supply sufficient fresh water to compensate for that drained off by the pipe 170. The cleaning solution is preferably supplied in the tank 166, and it is desired to use considerable pressure for spraying this cleaning solution on the cans. Therefore, the supply pipe 148 is connected by the pipe 171 to the outlet of a pump 172. Another pipe 173 running from the lower part of the tank 166 connects with the inlet of the pump to complete the system. The pump may be driven from the motor 74 through sprockets and chain 174. It is obvious that numerous ways might be provided for spraying the cleaning solution, rinsing solution and dry steam to the cans. Different arrangements of piping could be effectively used and the ones illustrated show only one simple embodiment to accomplish the desired result.

Means are provided for cleaning the cover of the can. This means comprises a pipe 175, Figures 6, 7 and 8, of substantially rectangular cross-section and running across the machine below the loading platform and discharge chute. The pipe is open at its end near the loading platform, so that the covers may be easily inserted. A sloping platform 176 is provided in the pipe and it has a plurality of perforations 177. A branch pipe 178 from the cleaning solution supply pipe 148 has two nozzles 179 which pass through the bottom of the pipe 175 and terminate at the sloping platform 176, and spray cleaning solution on the covers. The rinse supply pipe 155 also has a branch 180 having two nozzles 181 for supplying rinsing solution. The dry steam pipe has a branch 182 with a nozzle 183 for supplying dry steam to the covers. This branch 182 has a valve 184, Figure 2, so that the dry steam may be shut off when desired. The pipes 178 and 180 may also have valves so that, if it is not desired to use the cover washer, it may be closed off. A door 185, at the discharge end of the cover washer, is normally held closed by a spring 186. As the covers are pushed through, they will open this door and drop on the chute 187 where they may be led to any convenient place. Holes 188 in the bottom of the pipe 175 drain through pipes 189 into the tanks 166 and 167.

The operation of the machine will be apparent from the foregoing description and need not be described in detail. The cans A are set inverted on the loading platform 27, from which they are placed in the clutches by the operator. The cam 58 is holding the clutch open at this station. Immediately upon starting to move, the end 59 of the tail 57 will ride off the cam and the clutch will close on the can, gripping it firmly and centering it regardless of its diameter, within the limits for which the machine may designed. The can comes to a rest over the first one of the nozzles 36, and it is sprayed both inside and outside by the cleaning solution. The next step brings the can over the second nozzle 36, where it continues to be sprayed by the cleaning solution. The following movement of the intermittently rotated carrier centers the can over the brushing and scrubbing mechanism. The brushes rise in their closed position until they are in proper relation to contact with the can. They travel their entire height, being caused to ascend and descend by the shaft 82 operated by the driving mechanism and, while being raised and lowered, scrub the can. After the can has been scrubbed, it passes to the rinsing station where extremely hot water or water and steam are sprayed onto it by the first nozzle 38 and the piping 154. The next step brings the can to the second nozzle 38, where it continues to be sprayed by the rinsing solution. The following step brings the can to the station where the dry steam is sprayed. The next movement of the carrier brings the can to the discharge station where the lever 60 ejects it onto the discharge chute.

From the foregoing it will be evident that a machine is provided that will clean in an efficient manner ice cream or similar cans of different diameters and different heights. A great amount of labor is saved and handling of the can is eliminated. I have herein shown and described one embodiment of the invention; but, it will be obvious to those skilled in the art that various changes and modifications may be made in the parts and combinations of parts, without departing from the spirit of the invention, and all such changes and modifications are contemplated as come within the scope of the claims appended hereto.

Having thus described my invention, what I claim and desire to secure by Letters Patent is:

1. A machine of the character described having, in combination, a rotary carrier, a plurality of spring controlled clutches on said carrier adapted to grasp and center cans of different sizes placed therein, and expansible cleansing means timed with said carrier adapted to operate successively upon cans of different sizes while firmly held by said clutches against any rotary or vertical movement in relation to said carrier.

2. A machine of the character described having, in combination, a rotary carrier, a plurality of clutches on said carrier adapted to grasp and center cans of different sizes placed therein, means for successively opening said clutches to permit a can to be entered therein, and expansible cleansing means adapted to operate upon cans of different sizes while firmly held by said clutches against any rotary or vertical movement in relation to said carrier.

3. A machine of the character described having, in combination, a rotary carrier, a plurality of clutches on said carrier adapted to grasp and center cans of different sizes placed therein, means for successively opening said clutches to permit the cans to be entered therein, expansible cleansing means adapted to operate upon cans of different sizes while firmly held by said clutches against any rotary or vertical movement in relation to said carrier, and means for releasing the cans from said clutches.

4. A machine of the character described having, in combination, a rotatable carrier, a plurality of clutches on said carrier adapted to grasp and center cans of different sizes placed therein, means for successively opening said clutches to permit a can to be entered therein, expansible cleansing means timed with said carrier and adapted to successively enter said cans of different sizes while firmly held by said clutches against any rotary or vertical movement in relation to said carrier, and rotary brushes to operate on the outside of said cans of different sizes while held by said clutches.

5. A machine of the character described having, in combination, a rotatable carrier, a plurality of clutches on said carrier adapted to center cans of different sizes, cleansing means timed with said carrier and adapted to operate upon cans of different sizes held by said clutches, and means for preventing the clutches from closing if a can is not placed therein.

6. In a machine of the character described, the combination of a rotatable carrier, means for intermittently moving said carrier, a plurality of clutches on said carrier adapted to center cans of different sizes, means for successively opening the clutches to permit of a can being entered therein, cleansing means arranged along the path of the carrier and timed with the carrier to operate upon cans of different sizes while firmly held in said clutches, and means for removing the cans from said clutches.

7. In a machine of the character described, the combination of a rotatable carrier, means for intermittently moving said carrier, a plurality of clutches on said carrier adapted to center cans of different sizes, means for successively opening the clutches to permit of a can being entered therein, means for spraying a cleaning fluid on the inside and outside of the cans, a series of rotatable brushes arranged along the path of and timed with the movement of the carrier and adapted to operate upon cans of different sizes while firmly held in said clutches, and means for removing the cans from said clutches.

8. In a machine of the character described, the combination of a rotatable carrier, means for intermittently moving said carrier, a plurality of clutches mounted on said carrier adapted to center cans of different sizes, means for opening the clutches to permit of a can being entered therein, means for spraying a cleaning fluid on the inside and outside of the cans while held in said clutches, rotatable brushes adapted to operate upon cans of different sizes while held in said clutches, means for spraying a rinsing solution upon the cans while held in said clutches and means for opening said clutches and removing the cans.

9. In a machine of the character described, the combination of a rotatable carrier, means for intermittently moving said carrier, a plurality of clutches mounted on said carrier adapted to center cans of different sizes, means for opening the clutches to permit of a can being entered therein, means for spraying a cleaning fluid in the inside and outside of the cans while held in said clutches, means for spraying a rinsing solution upon the cans while held in said clutches, means for drying the cans, means for opening the clutches and removing the cans, and baffle-plates between each of the clutches adapted to form an individual compartment for the can and its clutch at each station.

10. A machine of the character described having, in combination, a carrier, a plurality of pairs of arms pivoted on said carrier, each of said pairs of arms being adapted to grasp and center cans of different sizes, cleansing means timed with said carrier and adapted to operate upon cans of different sizes while so held and centered, and baffle-plates between each pair of arms, said baffle-plates being secured to and carried by said carrier.

11. A machine of the character described having, in combination, a carrier, a plurality of pairs of arms pivoted on said carrier, links connecting the arms of each pair, springs for forcing the arms of each pair toward one another so as to cause them to grasp and center cans of different sizes, and means carried by one of the arms of each pair to prevent the arms from closing if a can is not placed between them.

12. A machine of the character described having, in combination, a carrier, a plurality of pairs of arms pivoted on said carrier, links connecting the arms of each pair, springs for forcing the arms of each pair toward one another so as to cause them to grasp and center cans of different sizes, and a latching member carried by one of the arms of each pair to cooperate with projections on the carrier so as to prevent the arms from closing if a can is not placed between them.

13. A machine of the character described having, in combination, an intermittently operable carrier, a plurality of clutches on said carrier adapted to firmly grasp and center cans of different sizes, expansible cleansing means arranged in the path of said carrier and adapted to operate upon cans of different sizes while held stationary by said clutches, said cleansing means including a plurality of rotatable brushes, means for raising and lowering said brushes when the carrier moves a can to the proper position over said brushes, and means for rotating said brushes.

14. A machine of the character described having, in combination, an intermittently operable carrier, a plurality of clutches on said carrier adapted to firmly grasp and center cans of different sizes, and cleansing means adapted to operate upon cans of different sizes while held by said clutches, said cleansing means including a vertically disposed rotating shaft, brushes mounted at the upper end of said shaft for cleaning the inside bottom of the can, means for vertically reciprocating said shaft and forcing said brushes against the inside bottom of cans of different heights, and rotating brushes mounted on said shaft for cleansing the outer and inner walls of the can.

15. A machine of the character described having, in combination, a carrier, a plurality of clutches on said carrier adapted to center cans of different sizes, and cleansing means adapted to operate upon cans of different sizes held by said clutches, said cleansing means including a vertically disposed rotating shaft, brushes mounted on the upper end of said shaft for cleaning the inside bottom of the can, brushes mounted on said shaft for cleaning the interior of the can, other brushes adapted to be rotated by said shaft for cleaning the outer neck of the can, means for forcing the interior brushes against the interior wall of cans of different diameters, means for forcing the outside brushes against the exterior wall of cans of different diameters, and means for raising and lowering the brushes.

16. A machine of the character described having, in combination, a carrier, a plurality of clutches on said carrier adapted to center cans of different sizes, and cleansing means adapted to operate upon cans of different sizes held by said clutches, said cleansing means including a vertically disposed rotating shaft, brushes mounted at the upper end of said shaft for cleaning the inside bottom of the can, means for forcing these brushes against the inside bottom of cans of different heights, brushes mounted on said shaft for cleaning the interior of the can, other brushes adapted to be rotated by said shaft for cleaning the outer neck of the can, means for forcing the interior brushes against the inner wall of cans of different diameters, means for forcing the outer brushes against the exterior wall of cans of different diameters, and means for raising and lowering the brushes.

17. A machine of the character described having, in combination, a carrier, a plurality of clutches on said carrier adapted to center cans of different sizes, and cleansing means adapted to operate upon cans of different sizes held by said clutches, said cleansing means including a vertically disposed rotating shaft, a brush mounted on its upper end for cleaning the inside bottom of the can, a pair of brushes on the upper end for cleaning the interior and inside bottom of the can, another pair of brushes adapted to be rotated by said shaft for cleaning the outer neck of the can, means for raising and lowering all of the brushes, and means for withdrawing the brushes from contact with the can after it has been cleaned.

18. A machine of the character described having, in combination, a carrier, a plurality of clutches on said carrier adapted to center cans of different sizes, and cleansing means adapted to operate upon cans of different sizes held by said clutches, said cleansing means including a vertically disposed rotating shaft of square cross-section, a cross-head on its upper end, a brush rigidly secured to the cross-head for cleaning the inside bottom of the can, brushes pivoted on the outer ends of said cross-head for cleaning the interior and inside bottom of the can, means for forcing the brushes against the interior of the can, a cross-head having sliding engagement with said square shaft and mounted below the rigid cross-head, brushes secured on said slidable cross-head for cleaning the outer neck of the can, means for forcing these brushes against the outer neck of the can, means carried by the upper rigid cross-head to expand the lower brushes after the can has been cleaned, and means carried by the lower cross-head to retract the upper brushes after the can has been cleaned.

19. A machine of the character described having, in combination, a carrier, a plurality of clutches on said carrier adapted to firmly grasp and center cans of different sizes, cleansing means adapted to operate upon cans of different sizes while held by said clutches, said cleansing means including a plurality of brushes rotatably mounted on a vertically disposed receptacle shaft, means for intermittently rotating said carrier, means for continuously rotating said brush carrying shaft, and means for raising and lowering said shaft when the carrier positions a can over said brushes.

20. A machine of the character described having, in combination, a carrier, a plurality of clutches on said carrier adapted to center cans of different sizes, and cleansing means adapted to operate upon cans of different sizes held by said clutches, said cleansing means including a plurality of rotatable brushes, means for resiliently forcing a pair of said brushes against the interior of the can while the carrier is held stationary, means for resiliently forcing another pair of said brushes against the outer neck of the can while the carrier is held stationary, positive means for retracting the inside brushes from the interior of the can after the can has been cleansed, and positive means for moving the outer brushes away from the can after said can has been cleansed.

21. A machine of the character described having, in combination, a carrier, a plurality of clutches on said carrier adapted to center cans of different sizes placed therein, and expansible cleansing means mounted for vertical movement and adapted to operate successively upon cans of different sizes while firmly held by said clutches, said expansible cleansing means including a plurality of rotatable brushes, means for raising and lowering said brushes when the carrier moves a can to the proper position over said brushes, means for expanding the brushes whereby they are brought into contact with the can while they are being raised and lowered, and cams cooperating with said brushes for collapsing them when they are in approximately their lowermost position.

22. A machine of the character described having, in combination, a carrier, a plurality of clutches on said carrier adapted to center cans of different sizes, and expansible cleansing means adapted to operate upon cans of different sizes held by said clutches, said cleansing means including a vertically disposed rotating shaft, brushes mounted on the upper end thereof for cleaning the inside bottom and interior of the can, means for vertically reciprocating said shaft and forcing said brushes against the inside bottom and interior of the can, and a lower pair of brushes for cleaning the outer neck of the can, said lower brushes rotated by said vertically disposed shaft but free to move in vertical relation to said shaft and having a limited up and down movement in relation to said shaft.

23. A machine of the character described having, in combination, a carrier, a plurality of clutches on said carrier adapted to center cans of different sizes, and cleansing means adapted to operate upon cans of different sizes held by said clutches, said cleansing means including a plurality of brushes rotatably mounted on the upper part of a vertically disposed receptacle shaft for cleaning the inside bottom of the can, means for continuously rotating said brush carrying shaft, means for forcing said brushes against the inside bottom of cans of different heights, lower brushes for cleaning the outer neck of the can, said brushes rotated by said vertically disposed shaft but free to move in vertical relation to said shaft and means for limiting the up and down movement of said brushes.

24. A machine of the character described having, in combination, a carrier, a plurality of clutches on said carrier adapted to center cans of different sizes, and cleansing means adapted to operate upon cans of different sizes held by said clutches, said cleansing means including a vertically disposed rotating shaft, brushes mounted at the upper end of said shaft for cleaning the inside bottom of the can, lower brushes for cleaning the outside of the can, means for forcing said upper brushes against the inside bottom of cans of different heights, the parts being so arranged that the upper brushes approaching the end of their downward stroke will engage the lower brushes and force said lower brushes downward and out of engagement with the can.

25. A machine of the character described having, in combination, a carrier, a plurality of clutches on said carrier adapted to center cans of different sizes, a plurality of brushes adapted to clean cans of different sizes held by said clutches, a shaft on which said brushes are slidably mounted, and driving means including means for intermittently moving said carrier, means for continuously rotating said brushes, and a bell crank lever operated by a crank continuously rotated by said driving means, said bell crank lever carrying a pair of arms, said arms connected to the vertical shaft on which the brushes are mounted by a lever so as to raise and lower said brushes.

26. A machine of the character described having, in combination, a rotatable carrier, means for intermittently operating said carrier, a plurality of clutches on said carrier adapted to grasp and center cans of different sizes, a drain table having a well therein arranged under the carrier, vertically reciprocable rotatable brushes arranged within the well and adapted to be raised to operate upon cans of different sizes while held by said clutches and means for raising and lowering said brushes.

27. A machine of the character described having, in combination, a rotatable carrier, means for intermittently operating said carrier, a plurality of clutches on said carrier adapted to center cans of different sizes, a drain table having a well therein arranged under the carrier, a plurality of vertically reciprocable rotatable brushes arranged within the well and adapted to be raised to operate upon cans of different sizes while held by said clutches, means for raising and lowering said brushes and an annular trough leading to both sides of the well and draining into the well, said trough having openings therein for nozzles for spraying the interior of the cans as they are moved along by the carrier.

28. A machine of the character described having, in combination, an intermittently operable rotary carrier, a plurality of clutches on said carrier adapted to grasp and center cans of different sizes placed therein, a drain table under said carrier having a well formed therein, a plurality of vertically reciprocable brushes normally disposed in said well and adapted to be elevated to operate upon cans of different sizes while held by said clutches, means for intermittently elevating said brushes, an inclined part opposite the well where the cans are discharged after they have been cleaned by said brushes, and a loading platform adjacent said inclined part from which the soiled cans may be placed in the machine.

29. A machine of the character described having, in combination, a carrier, a plurality of clutches on said carrier adapted to center and firmly grasp cans of different sizes placed therein, means for successively opening said clutches to permit the cans to be entered therein, expansible cleansing means timed with said carrier and adapted to operate upon cans of different sizes while held by said clutches, and means for ejecting a can from said clutches.

30. A machine of the character described having, in combination, a carrier, a plurality of clutches on said carrier adapted to center and firmly grasp cans of different sizes placed therein, means for successively opening said clutches to permit the cans to be entered therein, expansible cleansing means timed with said carrier and adapted to operate upon cans of different sizes while held by said clutches, and a spring controlled lever adapted to contact with a can and eject it from one of the clutches.

31. In a machine of the character described, a carrier, clutches on said carrier for firmly gripping and holding cans of different sizes, and rotary expansible cleansing means for cleaning the inside and outside of cans of different heights and diameters while held by said clutches, said cleansing means including a plurality of rotating brushes mounted on a vertically reciprocable shaft, means for resiliently forcing said brushes against the inside bottoms of said cans and against the inner and outer walls of said cans, and positive means for retracting said brushes from the interior of the cans and moving said brushes away from the outside of said cans.

32. A machine of the character described having, in combination, a carrier, a plurality of clutches on said carrier adapted to grasp and center cans of different sizes placed therein, means for successively opening said clutches to permit a can to be placed therein, rotary expansible cleansing means timed with said carrier and adapted to operate upon cans of different sizes while firmly held by said clutches, springs to aid centrifugal force in urging said expansible cleansing means against the walls of the can, and positive means for collapsing said cleansing means.

In testimony whereof I affix my signature.

WINFRED N. LURCOTT.